UNITED STATES PATENT OFFICE.

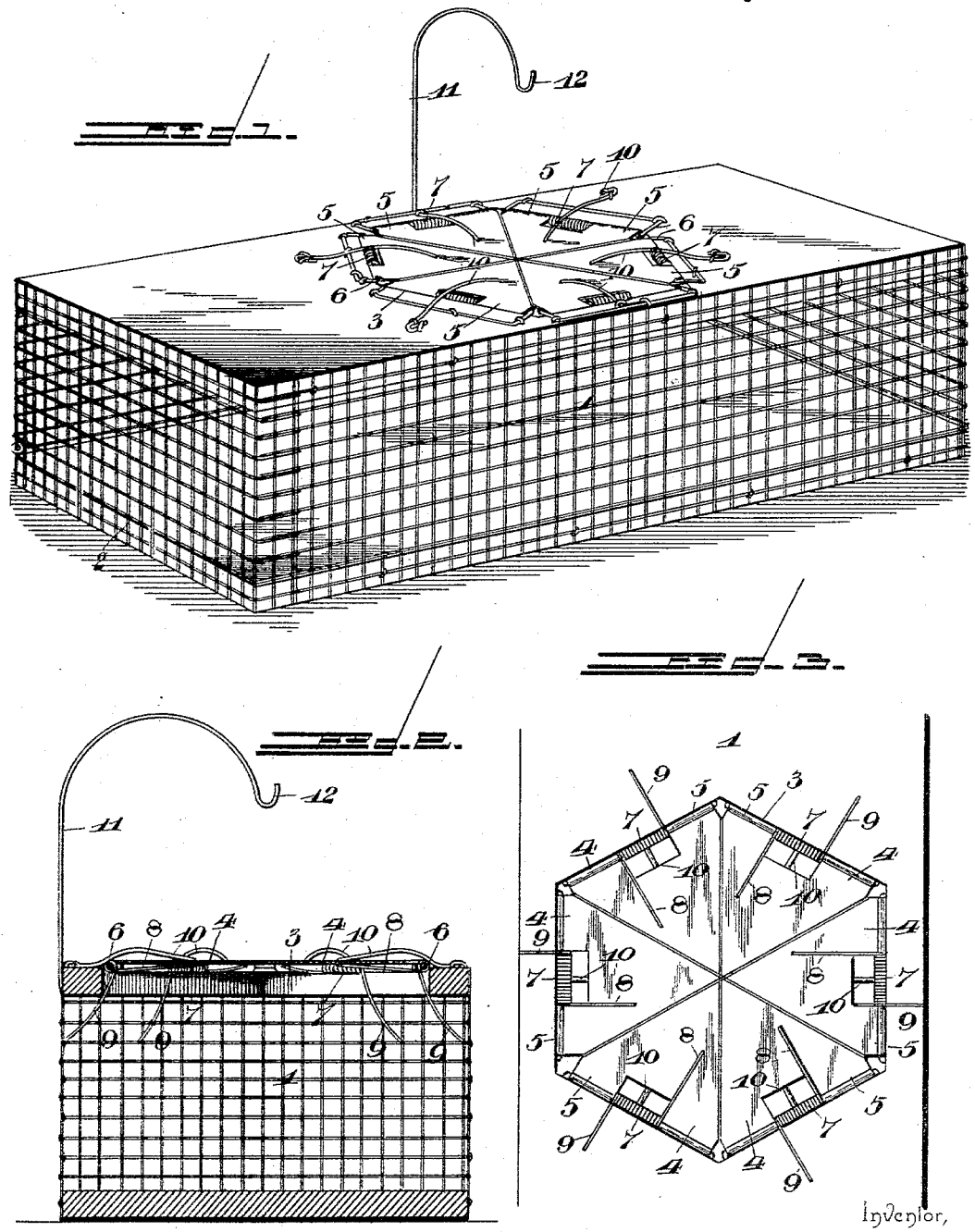

THOMAS H. COTTRELL, OF ANNVILLE, PENNSYLVANIA.

ANIMAL-TRAP.

SPECIFICATION forming part of Letters Patent No. 563,748, dated July 14, 1896.

Application filed May 8, 1896. Serial No. 590,797. (No model.)

*To all whom it may concern:*

Be it known that I, THOMAS H. COTTRELL, a citizen of the United States, residing at Annville, in the county of Lebanon and State of Pennsylvania, have invented a new and useful Animal-Trap, of which the following is a specification.

The invention relates to improvements in animal-traps.

The object of the present invention is to improve the construction of animal-traps, and to provide a simple, inexpensive, and efficient one which will be especially adapted for rats, and which will always be set, or in condition for catching them.

The invention consists in the construction and novel combination and arrangement of parts, hereinafter fully described, illustrated in the accompanying drawings, and pointed out in the claim hereto appended.

In the drawings, Figure 1 is a perspective view of a trap constructed in accordance with this invention. Fig. 2 is a transverse sectional view of the same. Fig. 3 is a reverse plan view of the central portion of the top of the trap, illustrating the manner of yieldingly supporting the tilting platforms.

Like numerals of reference designate corresponding parts in all the figures of the drawings.

1 designates a cage or receptacle, forming the body of a trap and preferably provided with wire-work sides and ends, one end 2 being hingedly mounted and forming a door to enable captured animals to be taken from the trap. The trap is provided at its top with a central polygonal opening 3, in which is mounted a series of radially-disposed substantially triangular tilting platforms 4, hinged at their outer edges to the top of the trap, and adapted to swing downward under the weight of a rat, or other animal, to precipitate the same into the trap. Each triangular platform is provided at its outer edge with oppositely-disposed eyes 5, receiving a pintle-rod 6; the eyes are located at opposite sides of the tilting platform, as shown, and are preferably constructed by rolling the edges of the platform on themselves; and a spiral spring 7 is disposed on the central portion of the pintle between the eyes 5, and is provided at its terminus with oppositely-disposed arms 8 and 9, engaging, respectively, the lower face of the platform and the adjacent edge of the top of the trap. The spring supports the tilting platform, which is preferably constructed of sheet metal, normally in a horizontal position, and permits the platform to swing downward when subjected to the weight of an animal.

The upward movement of the tilting platforms is limited to maintain them normally in a horizontal position by a series of resilient rods 10, secured to the upper face of the top of the trap, disposed radially and having their inner ends free and engaging the upper faces of the platforms. The pintles 7 are preferably constructed of wire, and consist of rectangular frames secured to the upper face of the top of the trap, and projecting over the central opening to enable the tilting platforms to swing perfectly clear of the top of the trap.

A bait for attracting the animals is suspended from a support 11, consisting of a wire or rod, secured to one side of the trap and having its upper portion curved over the opening in the top thereof and terminating in a hook 12, arranged centrally of the opening 3. The bait is arranged to attract the animals and cause them to tread upon the tilting platforms in order to obtain it. The platforms are tilted or swung downward, as soon as they are subjected to the weight of an animal, and will cause it to slide downward into the trap, and as the platforms are incapable of swinging upward beyond a horizontal position, a rat, or other animal, cannot possibly escape from the interior of the trap.

It will be seen that the trap is exceedingly simple and inexpensive in construction, that it is positive and reliable in operation, and that it is always set.

Changes in the form, proportion, and minor details of construction may be resorted to without departing from the principle or sacrificing any of the advantages of this invention.

What I claim is—

A trap comprising a cage or receptacle provided at its top with a central opening, a series of radially-disposed tilting platforms arranged over the opening and provided at their outer edges with oppositely-disposed eyes, pintles mounted on the cage or receptacle, extending through the eyes of the platforms and hinging them to the cage or receptacle, spiral springs disposed on the pintles, located between the eyes of the platforms and provided at their terminals with oppositely-disposed arms, engaging the lower faces of the platforms and the adjacent portions of the cage or receptacle, resilient rods mounted on the top of the cage or receptacle and engaging the upper faces of the tilting platforms, and a bait-support located over the platform, substantially as described.

In testimony that I claim the foregoing as my own I have hereto affixed my signature in the presence of two witnesses.

THOMAS H. COTTRELL.

Witnesses:
  GEO. W. STINE,
  A. C. RIGLER.